PROJECTED IMAGE TRANSMITTING APPARATUS

Filed July 23, 1962 8 Sheets-Sheet 1

INVENTORS
FRANK P. BENNETT
ALBERT E. WEBB
BY
Cromwell, Greist & Warden
Attys.

PROJECTED IMAGE TRANSMITTING APPARATUS

Filed July 23, 1962 8 Sheets-Sheet 2

INVENTORS
FRANK P. BENNETT
ALBERT E. WEBB
BY
Cromwell, Greist & Warden
Attys.

INVENTORS
FRANK P. BENNETT
ALBERT E. WEBB
BY
Cromwell, Greist & Warden
Attys.

INVENTORS
FRANK P. BENNETT
ALBERT E. WEBB
BY
Cromwell, Greist & Warden
Attys.

INVENTORS
FRANK P. BENNETT
ALBERT E. WEBB
BY
Cromwell, Greist & Warden
Attys.

PROJECTED IMAGE TRANSMITTING APPARATUS

INVENTORS
FRANK P. BENNETT
ALBERT E. WEBB
BY
Cromwell, Greist & Warden
Attys.

PROJECTED IMAGE TRANSMITTING APPARATUS

Filed July 23, 1962 8 Sheets-Sheet 7

INVENTORS
FRANK P. BENNETT
ALBERT E. WEBB
BY
Cromwell, Greist & Warden
Attys.

INVENTORS
FRANK P. BENNETT
ALBERT E. WEBB
BY
Cromwell, Greist & Warden
Attys.

United States Patent Office 3,130,635
Patented Apr. 28, 1964

3,130,635

PROJECTED IMAGE TRANSMITTING APPARATUS

Frank P. Bennett, Chicago, and Albert E. Webb, Glenview, Ill., assignors to Sawyers Research Development Corporation, Chicago, Ill., a corporation of Delaware Filed July 23, 1962, Ser. No. 211,813
9 Claims. (Cl. 88—24)

This invention relates to apparatus for transmitting projected images by reflected light and it has particular relation to such apparatus for reflecting an image from an image projector to a viewing screen.

Among the objects of this invention are: To provide for self storing mirror housings in a projector housing of image projecting apparatus in a new and improved manner; to raise or lower the housings for accommodating different elevations of the image to be projected and viewed; to effect the elevating operations through the cooperation of a rack on a support and pinion means on a shaft journaled in the projector housing on which shaft upper and lower mirror housings also are journaled; and to cause the mirror housings to swing out of the projector housing during the initial part of its up movement and to swing into the projecting housing during the final part of its down movement.

Figures 1, 3:
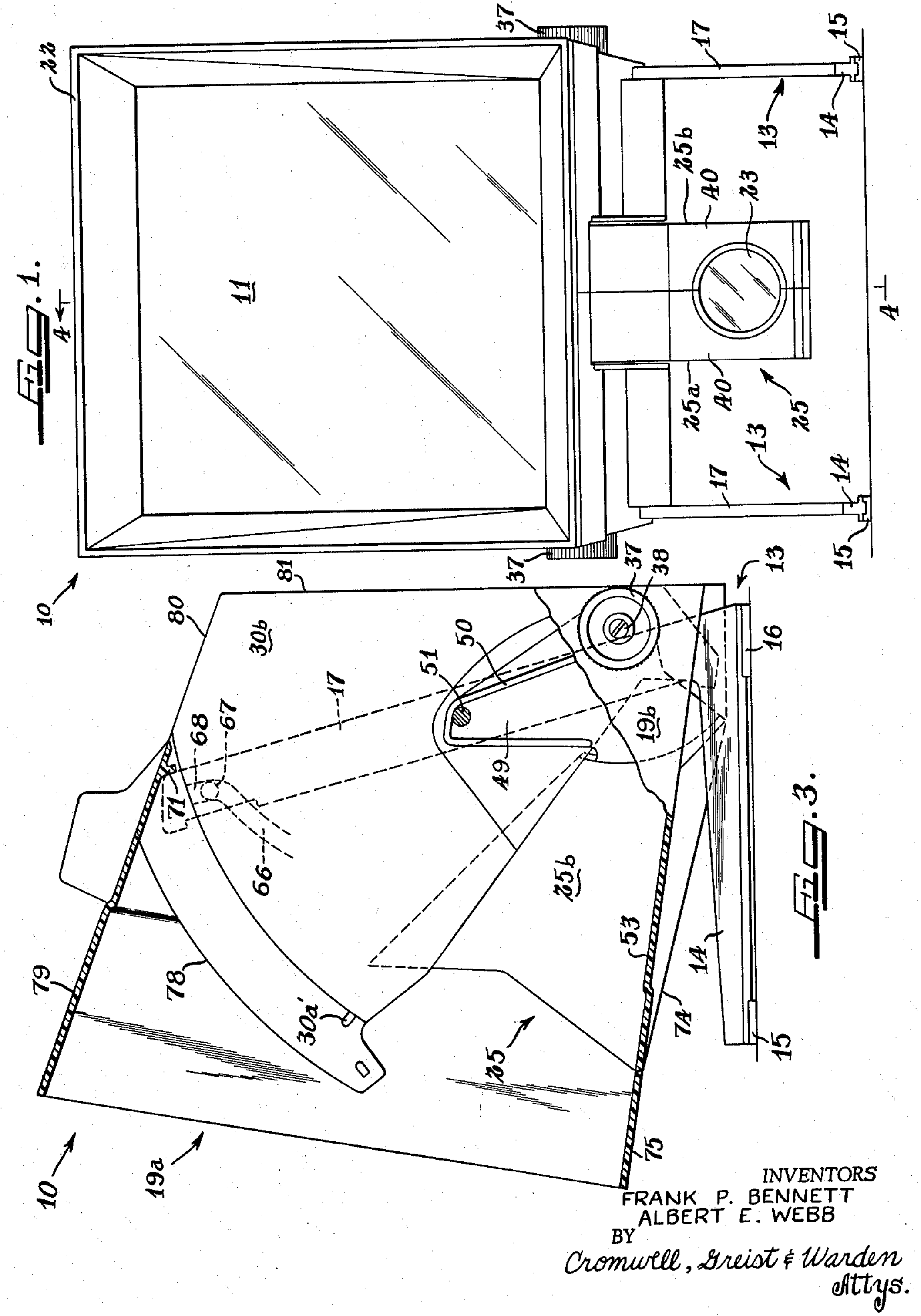
FIG. 1 is a view, in front elevation, of image projecting apparatus in which this invention is embodied, the construction being shown in an elevated position with the mirror housings in their unfolded or operative positions.
FIG. 3 is a view, partly in side elevation and partly in section, taken along the line 3—3 of FIG. 15 and showing the image projecting apparatus of the present invention in the folded position, the viewing screen supporting frame being omitted.
Figure 4:
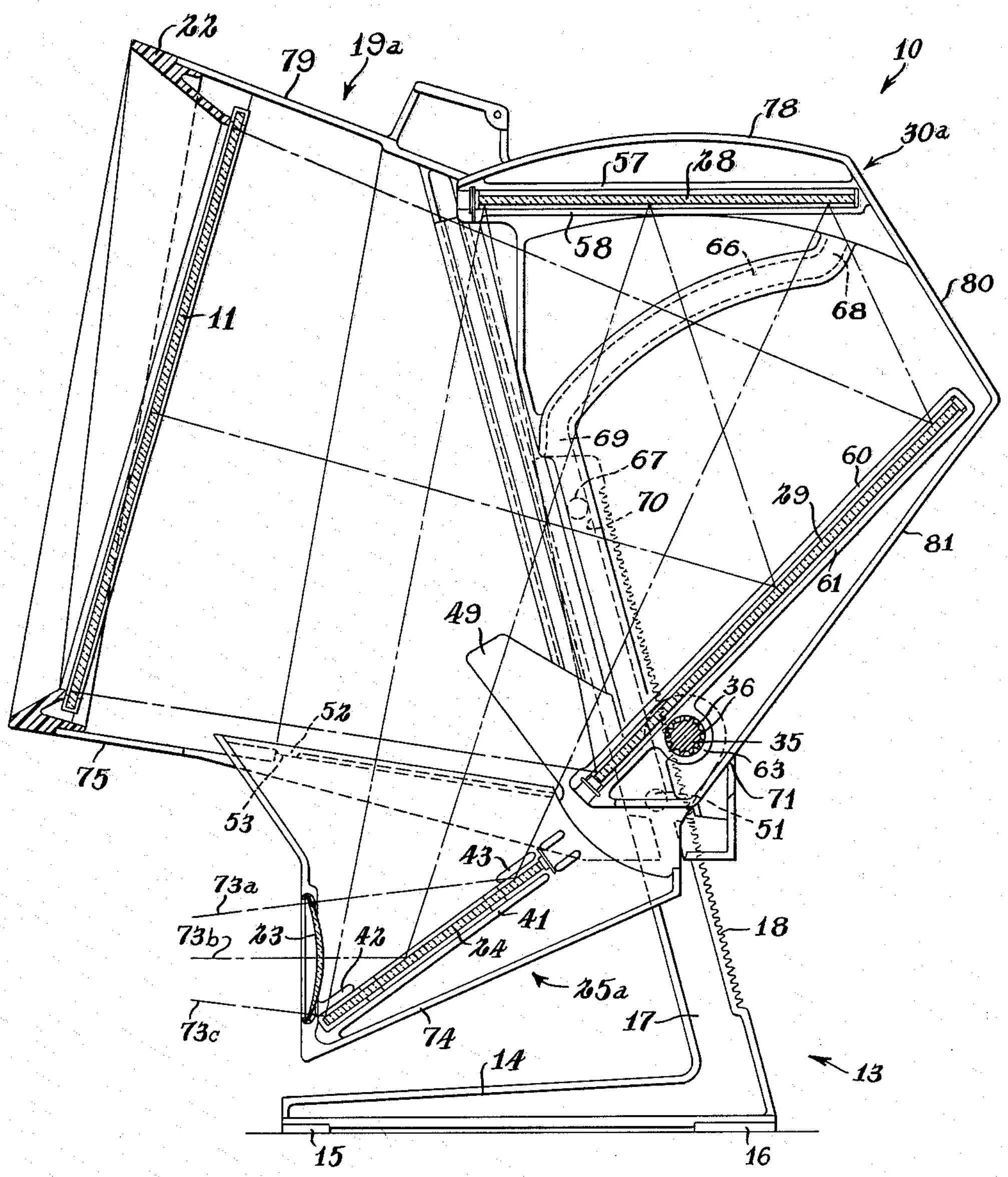
FIG. 4 is a vertical sectional view taken generally along the line 4—4 of FIG. 1 and showing the projector housing in an elevated position with the mirror housings in their unfolded operative positions.

Referring now particularly to FIGS. 1, 2, 3, 4 and 15, it will be observed that the reference character 10 designates, generally, image transmitting apparatus in which the present invention is embodied. A viewing screen 11 is illustrated in FIGS. 1 and 4 on which an image can be viewed that is provided by a suitable image projector, shown generally at 12 in FIG. 2. It will be understood that the image projector 12 can comprise any conventional stereopticon equipment that is used for projecting slides or colored transparencies and normally is employed in conjunction with a relatively large screen located some distance away onto which the image is directly projected. In accordance with the present invention the image transmitting apparatus 10 can be employed with the image projector 12 of conventional construction to display the image on the screen 11 without requiring the use of a distance screen and without necessitating the use of the space incident to the use of a distant screen.

The image transmitting apparatus 10 includes support means in the form of a pair of L-shaped supports 13—13 which include foot portions 14—14 that are provided with pads 15 and 16 to facilitate the placing of the apparatus on a finished surface without marring it. The L-shaped supports 13—13 include leg portions 17—17 which are inclined away from the vertical through a small acute angle such as 15°. The leg portions 17—17 form rail members that are employed for guiding purposes in a manner to be described. Each leg portion 17 includes a rack 18 on its rear side for cooperation with pinion means, to be described, for raising and lowering a projector housing that is indicated, generally, at 19 and formed preferably of suitable plastic material which can be molded to the shape desired. The projecting housing 19 is made up of two mating parts **19*a* and 19*b*, the part 19*a* being located to the left of the image projecting apparatus 10, as viewed in FIG. 1, while the other is located to the right side. In general the mating parts 19*a* and 19*b* are identical except that they are of opposite hand construction and thus a description of one will suffice for a description of both. The mating part 19*a*** is shown in detail in FIGS. 11, 12, 13 and 14 of the drawings.

Mounted on the projector housing 19 and carried by both of the mating parts **19*a* and 19*b* is a rectangular frame 22, formed preferably of plastic, that is arranged to carry the viewing screen 11 to which the image is transmitted by reflection from the image projector 12** and where the image is viewed at a considerable degree of enlargement.

Figures 2, 5:
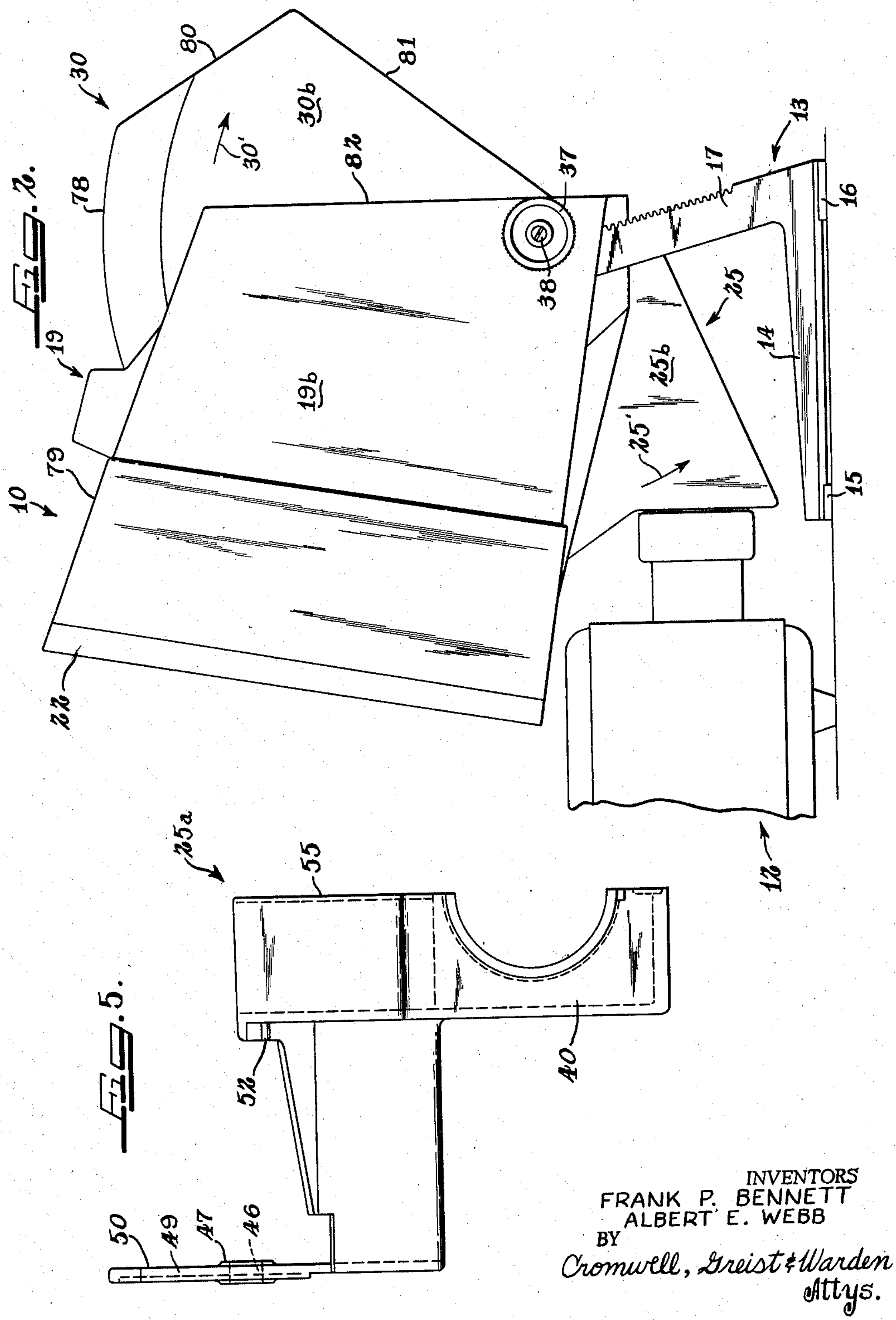
FIG. 2 is a view, in side elevation, of the construction shown in FIG. 1.
FIG. 5 is a view, in front elevation, of one of the mating parts of the lower mirror housing.
Figures 6, 7:
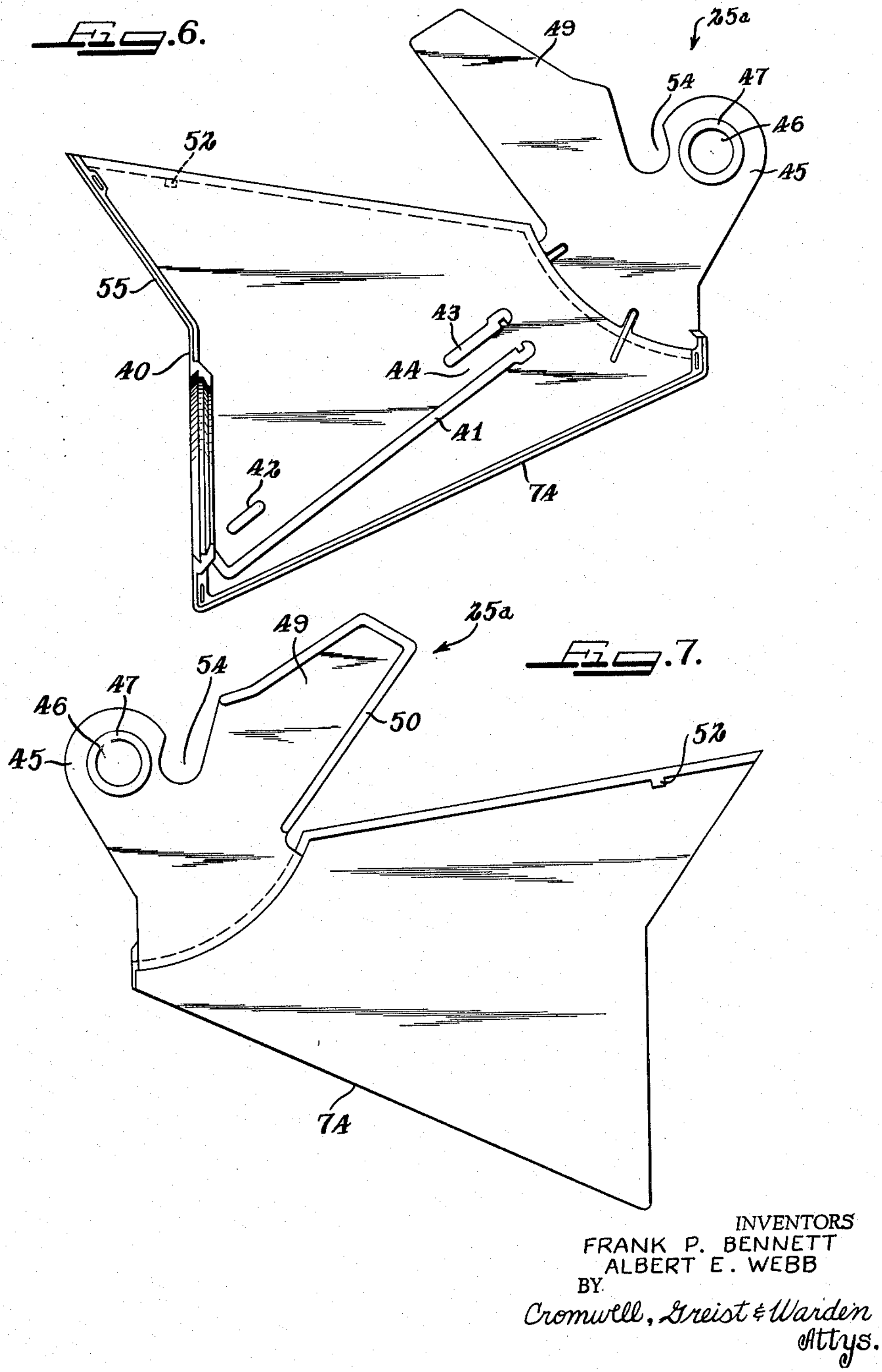
FIG. 6 is a view, in side elevation and looking from right to left, of the part of the mirror housing shown in FIG. 5.
FIG. 7 is a view, in side elevation, looking from the other side of the part of the lower mirror housing shown in FIG. 5.

It will be understood that the image projector 12 is located, generally, as shown in FIG. 2 when the image transmitting apparatus 10 is unfolded for use. In this position, as shown in FIG. 4, the light rays from the image projector 12 pass through a concave lens 23 which focuses them on a lower mirror 24 that is inclined to the horizontal and serves to reflect the rays generally upwardly. The lower mirror 24 is mounted on and moves with a lower mirror housing, shown generally at 25, and formed of suitable plastic material. The lower mirror housing 25 is formed of two mating parts **25*a* and 25*b* which, like the mating parts 19*a* and 19*b* of the projector housing 19, are generally of identical construction but of opposite hand. The details of construction of the left mating part 25*a* of the lower mirror housing 25** are shown in FIG. 5, 6 and 7 of the drawings.

Figure 9:
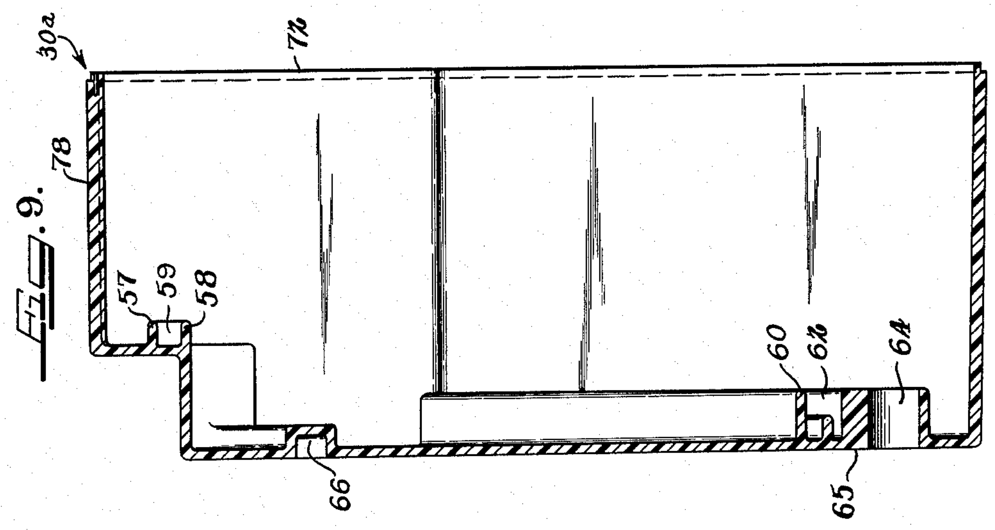
FIG. 9 is a vertical sectional view taken generally along the line 9—9 of FIG. 8.
Figure 8:
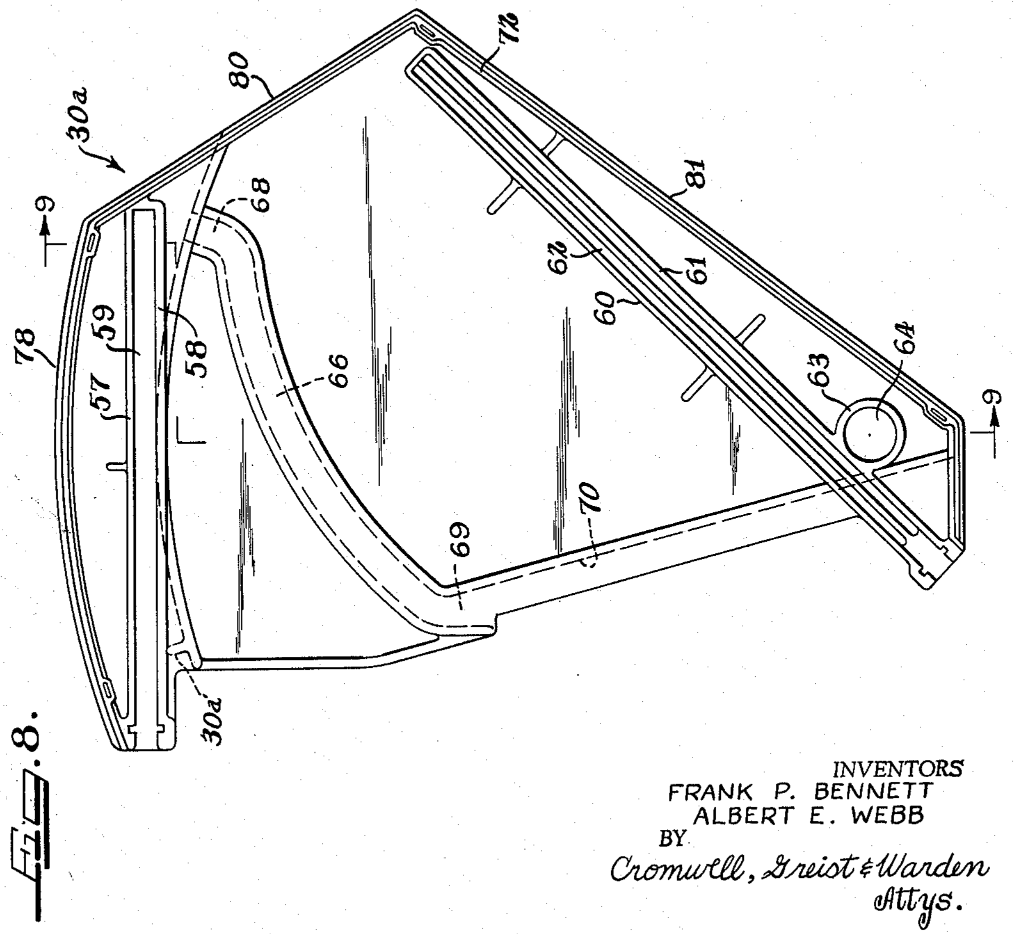
FIG. 8 is a view, in side elevation, of one part of the upper mirror housing.
Figure 11:
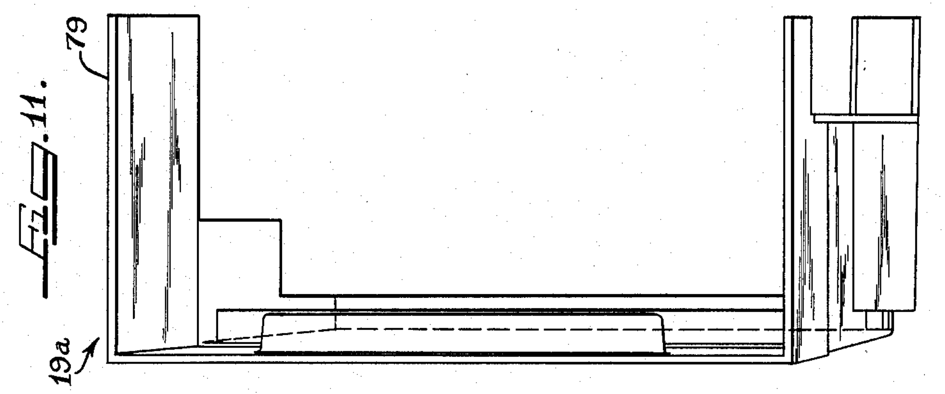
FIG. 11 is a view, in front elevation, of one of the mating parts for the projector housing.
Figure 10:
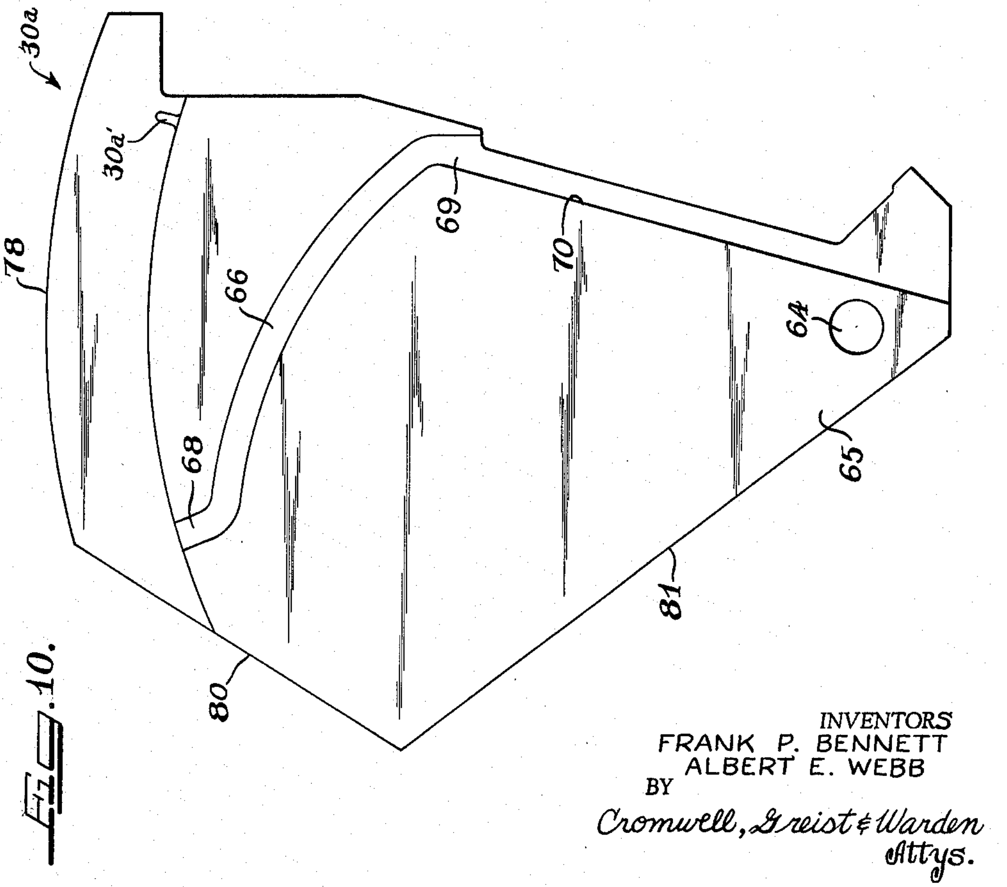
FIG. 10 is a view of the part of the upper mirror housing looking at the side opposite to the side viewed in FIG. 8.

The light rays are reflected by the lower mirror 24 onto an upper mirror 28 and thence onto an intermediate mirror 29, FIG. 4, from which they are reflected onto the rear side of the viewing screen 11 making the image observable on its front side at an enlarged scale. The upper and intermediate mirrors 28 and 29 are carried by an upper mirror housing that is shown, generally, at 30 and is formed of suitable plastic material. Like the projector housing 19 and the lower mirror housing 25, the upper mirror housing 30 is formed of mating parts 30a and 30b the details of construction of which are generally the same except the one is of opposite hand to the other. The details of construction of the mating part 30a of the upper mirror housing 30 are shown in FIGS. 8, 9 and 10 of the drawings.

Now it will be apparent that the image transmitting apparatus 10 comprises, generally, three movable parts, i.e., the projector housing 19 carrying the viewing screen 11, the lower mirror housing 25 carrying the lower mirror 24, and the upper mirror housing 30 carrying the upper and intermediate mirrors 28 and 29 all mounted for movement on the L-shaped supports 13—13. The operative positions of these several parts are shown in FIG. 4 where it will be apparent that the lower mirror housing 25 has moved downwardly and out of the lower side of the projector housing 19 while the upper mirror housing 30 has moved upwardly and out of the projector housing 19. In their positions here shown the mirrors 24, 28 and 29 are so inclined with respect to each other as to reflect properly the image from the image projector 12 onto the rear side of the viewing screen 11. When the image transmitting apparatus 10 is not in use, the projector housing 19 can be lowered and at the same time the lower mirror housing 25 is folded into it together with the upper mirror housing 30 with the result that the assembly occupies a minimum of space as will be apparent from a consideration of FIGS. 3 and 15 of the drawings.

In FIGS. 11, 12, 13 and 14 of the drawings the details of construction of the mating part 19a of the projecting housing 19 are shown. The mating part 19a is located on the left side of the image transmitting apparatus 10 as viewed from the front. The mating part 19a is provided with an inclined guide groove 33 for receiving slidably therein the leg portion or rail member 17 of the left L-shaped support 13. It will be understood that the arrangement of each leg portion or rail member 17 in the respective guide groove 33 serves to permit up or down movement of the projector housing 19 and parts associated therewith. Near the lower right corner of the mating part 19a of the projector housing 19, FIG. 12, there is provided a bearing opening 34 for receiving a shaft 35, FIG. 4, which is provided with pinion teeth 36 along its entire length for engagement with the teeth of the racks 18 on the leg portions or rail members 17—17. At the ends of the shaft 35 knurled operating knobs 37—37 are provided, FIGS. 1 and 3, and are suitably held non-rotatably thereon by screws 38 threaded into the ends of the shaft 35. It will be understood that, as the shaft 35 is rotated by the operating knobs 37—37, the projector housing 19 and parts associated therewith are moved upwardly or downwardly along the racks 18, depending upon the direction of rotation of the shaft 35. Thus it will be apparent that the projector housing 19 has translatory movement only with respect to the L-shaped supports 13—13.

As pointed out, the lower mirror housing 25 is formed of two mating parts 25a and 25b. The mating part 25a is shown in more detail in FIGS. 5, 6 and 7 of the drawings. Here it will be observed that it is provided with a lens mounting section 40 having a semi-circular opening for receiving and suitably mounting the concave lens 23 above referred to. As shown more particularly in FIG. 6 an elongated lower rib 41 is formed integrally with a side wall of the mating part 25a in spaced relation to shorter upper ribs 42 and 43 with the arrangement providing a groove 44 opposite a similar groove in the other mating part 25b for receiving and holding the lower mirror 24 in the proper angular position to reflect the light rays onto the upper mirror 28. In addition, the mating part 25a includes a bearing extension 45 provided with a bearing opening 46 through which the shaft 35 extends and on which shaft both of the mating parts 25a and 25b are journaled. Thus, while the projector housing 19 has only translatory movement with respect to the L-shaped supports 13—13, the lower mirror housing 25 has both translatory and rotary movement with respect thereto.

Figures 12, 13, 14:
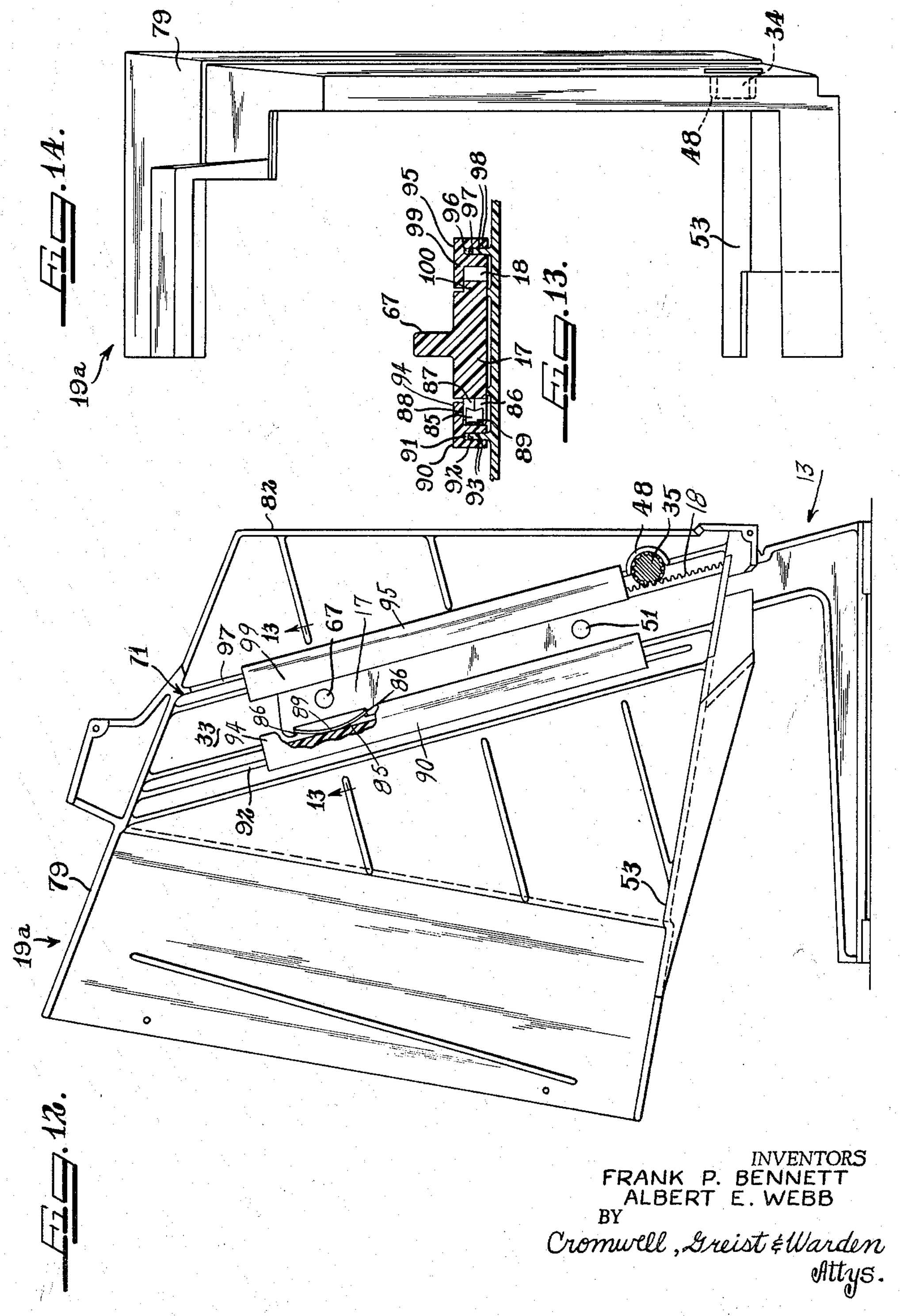
FIG. 12 is a view, in side elevation, looking from right to left of FIG. 11 and showing in addition one of the L-shaped support members and its relation to the associated part of the projector housing.
FIG. 13 is a sectional view taken generally along the line 13—13 of FIG. 12.
FIG. 14 is a view, in end elevation, of the part of the projector housing shown in FIG. 12, the view being taken from right to left.
Figure 15:
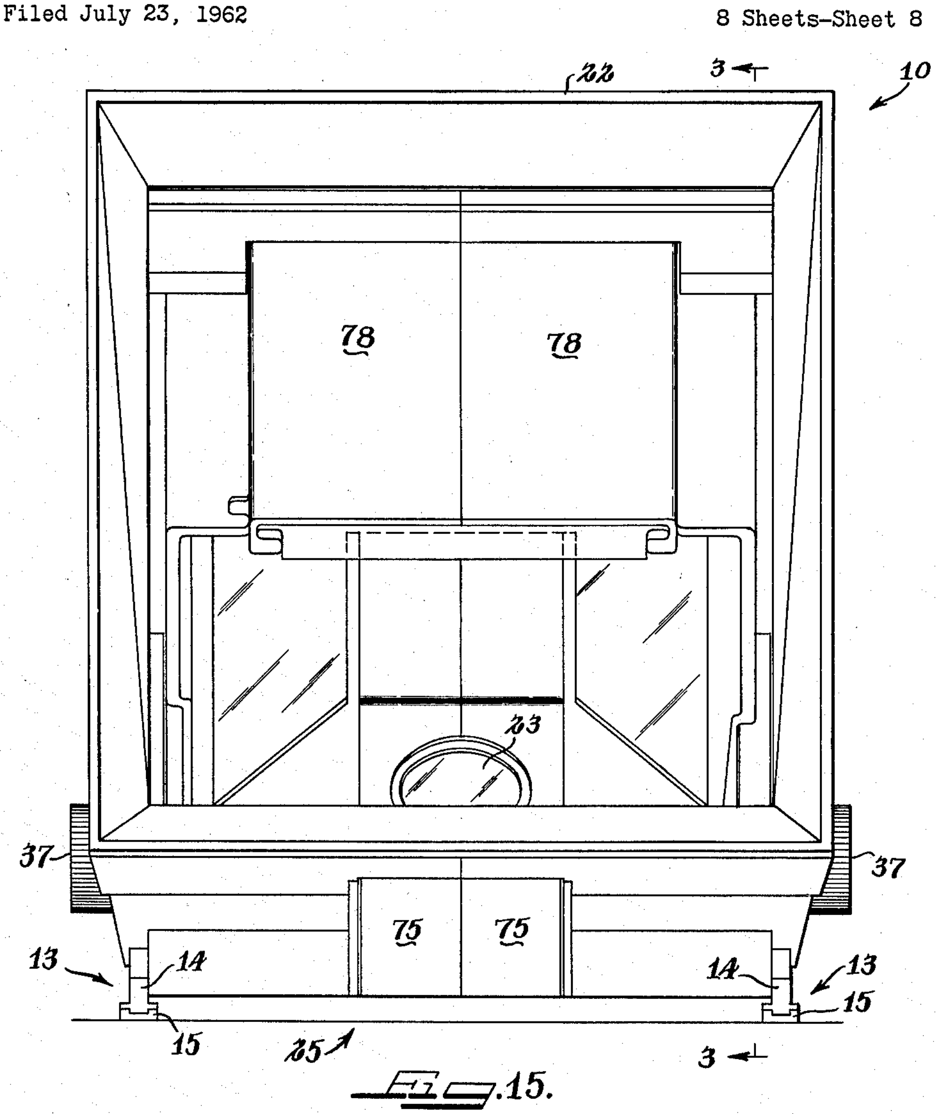
FIG. 15 is a view, similar to FIG. 1, but showing the image projecting apparatus in the folded or collapsed position and with the viewing screen omitted.

Surrounding the bearing opening 46 is an annular flange 47 the outer side of which is arranged to bear against a semi-circular flange 48, FIG. 12, formed integrally with the respective mating part 19a of the projector housing 19. The mating part 25a also includes a guide arm 49 having a marginal flange 50 that is arranged to engage a lateral detent or guide pin 51, FIG. 3, which extends outwardly from each of the leg portions or rail members 17. As the shaft 35 is rotated to elevate the projector housing 19 and therewith the lower mirror housing 25, the latter is biased by gravity to hold the flange 50 against the lateral detent or guide pin 51 on each of the leg portions or rail members 17—17 to control the downward rotation of the lower mirror housing 25 in the direction indicated by arrows 25', FIG. 2, to the position shown in FIG. 4 as the projector housing 19 is elevated. Further downward swinging movement of the lower mirror housing 25 out of the lower part of the projector housing 19 is prevented when a stop boss 52, FIGS. 4, 6, and 7, engages an upwardly facing surface 53, FIGS. 12 and 14, on the mating part 19a of the projector housing 19. It will be understood that the weight of the lower mirror housing 25 which carries the lens 23 and lower mirror 24 is sufficient to insure that it will be rotated to the position shown in FIG. 4 when the projector housing 19 is elevated to an extent sufficient to move the marginal flange 50 with respect to the lateral detent 51 on each of the leg portions or rail members 17 to permit such movement.

In order to permit upward movement of the projector housing 19 to the maximum extent, a slot 54, FIGS. 6 and 7, is provided in the lower mirror housing part 25a between the bearing extension 45 and its guide arm 49 to permit movement past a lateral detent or guide pin 67 to be described. Since the parts 25a and 25b of the lower mirror housing 25 are arranged to interfit along their meeting edges, the part 25a is provided with a flange 55, FIG. 5, which is arranged to overlie a similar flange on the mating part 25b.

FIGS. 8, 9 and 10 of the drawings show the details of construction of the mating part 30a of the upper mirror housing 30. For supporting the upper mirror 28 upper and lower ribs 57 and 58 are provided to form a groove 59 therebetween which is positioned opposite a similar groove in the mating part 30b for receiving the respective ends of the upper mirror 28. The intermediate mirror 29 is similarly mounted in the mating parts 30a and 30b. Upper and lower ribs 60 and 61 are formed integrally with the outer side wall of the mating part 30a to provide a groove 62 therebetween which is opposite a similar groove in the mating part 30b. The ends of the intermediate mirror 29 are positioned in the grooves one of which is indicated at 62 for accurate positioning with respect to the upper mirror 28. Near its lower end the mating part 30a is provided with a bearing opening 64 through which the shaft 35 extends and on which shaft the mating part 30a together with its complementary mating part 30b is rotatably mounted. As shown in FIGS. 9 and 10 the outer surface 65 of the mating part 30a is a planar surface and it bears against the inner side of the annular flange 47, FIG. 5, of the respective guide arm 49 forming a part of the mating sections 25a and 25b of the lower mirror housing 25.

It will be recalled that provision is made for swinging the upper mirror housing 30 to the position shown in FIG. 4 when the image transmitting apparatus 10 is to be used and for swinging it to the closed or collapsed position shown in FIG. 3 when the apparatus is not being used and is to be stored. In order to provide for such movement of the upper mirror housing 30 about the shaft 35 and to control this movement, the mating part 30*a* is provided with an arcuate groove 66 on its outer side and facing outwardly for cooperation with a lateral detent or guide pin 67, FIG. 4, which is carried by the left leg 17 of the left L-shaped support 13 and projects inwardly therefrom. It will be understood that only the left mating part 30*a* is provided with the groove 66 and that only the left L-shaped support 13 is provided with a lateral detent or guide pin 67.

When the knob 37, FIG. 2, is rotated in a counterclockwise direction with the lateral detent or guide pin 67 located in the upper end 68 of the arcuate groove 66, the upper mirror housing 30 is caused to rotate in a clockwise direction as indicated by arrow 30' about the axis of rotation of the shaft 35 since the lateral detent or guide pin 67 is stationary while the upper mirror housing and particularly the mating part 38 thereof is moved upwardly. The upper mirror housing 30 continues to rotate about the axis of rotation of the shaft 35 as the entire assembly continues to be elevated by continued rotation of the operating knob 37. The upper mirror housing 30 continues to move out of the projector housing 19 until the lower end 69, FIG. 10, of the arcuate groove 66 is reached whereupon further upward movement of the assembly is accompanied by movement of a flange 70 along the right side of the lateral detent or guide pin 67 as viewed in FIG. 3. Further outward rotation of the upper mirror housing 30 from the projector housing 19 is prevented by engagement of a stop 30*a'* on the upper mirror housing part 30*a* with a stop 71 on projector housing part 19*a*. As shown in FIGS. 8 and 9 an overlying flange 72 is provided along the edge of the mating part 30*a* for cooperation with a similar flange on the mating part 30*b* to provide a light tight construction at the junction between these parts.

As shown in FIG. 4 the lower mirror housing 25 and the upper mirror housing 30 are unfolded or rotated out of the projector housing 19 until their limits of rotating movement are reached and further rotation thereof is prevented by the means described. Thereafter continued rotation of the shaft 35 in a counterclockwise direction serves only to raise the projector housing 19 along with the lower and upper mirror housings 25 and 30. In the positions to which the lower and upper mirror housings 25 and 30 have been swung the mirrors 24, 28 and 29 are properly located so that light rays 73*a*, 73*b* and 73*c*, indicated by the broken lines, are reflected from mirror to mirror and finally impinge on the rear side of the viewing screen 11 where the image is shown with a substantial degree of enlargement over the image applied to the lens 23 from the image projector 12.

When it is desired to place the image transmitting apparatus 10 in condition for storage, the shaft 35 is rotated in a clockwise direction, as viewed in FIG. 4, to lower the projector housing 19 together with the lower and upper mirror housings 25 and 30. During the final portion of the downward movement of these housings, the lateral detents or guide pins 51 engage the marginal flanges 50 on the guide arms 49 of the mating parts 25*a* and 25*b* of the lower mirror housing 25 so that continued downward movement of the assembly is accompanied by rotation of the lower mirror housing 25 to the folded position shown in FIG. 3 where its lower wall 74 is positioned to constitute essentially an extension of the lower wall 75 of the mating part 19*b* of the projector housing 19.

Also during the final portion of the downward movement of the assembly the detent or guide pin 67, FIG. 4, engages the lower end 69 of the arcuate groove 66 and then follows therealong to cause the upper mirror housing 30 to swing to the position shown in FIG. 3 until the lateral detent or guide pin 67 reaches the upper end 68 and thereby prevents further folding or inward movement of the upper mirror housing 30. As the upper mirror housing 30 swings to the folded position, its arcuate top 78 swings underneath the flat top 79 of the mating part 19*a* of the projector housing 19. The folding movement continues until a flat side 80 of the mating part 30*a* of the upper mirror housing 30 is positioned to constitute generally an extension of the flap top 79 as seen in FIG. 3. Then the flat rear side 81 of the mating part 30*b* of the upper mirror housing 30 extends generally vertically and is coplanar with the flat side 82, FIG. 12, of the mating part 19*a* of the projector housing 19.

In order to hold the projector housing 19 and the mirror housings 25 and 30 in any elevated position to which they may be moved, friction springs are provided one of which is shown at 85 in FIGS. 12 and 13. Each friction spring 85 is curved and has fishtail ends that bear against V-shaped shoulders 86—86 at the ends of a slot in a flange 88 that extends laterally from the leg portion 17 of the support 13 on the side opposite the rack 18. The bowed central portion of the spring 85 reacts against a face 89 of an elongated retainer 90 which has a lengthwise extending slot 91 for receiving a flange 92 extending inwardly from a side wall of the housing part 19*a*. The flange 92 is secured in the slot 91 by cement 93. A flange 94 from the retainer 90 overlies the flange 88 and acts as a guide for the housing 90 in its translatory movement relative to the support 13. The frictional engagement between the relatively sliding parts is such that the projector housing 19 and the mirror housings 25 and 30 are held in any position to which they may be elevated while at the same time permitting up and down movement by rotation of the operating knobs 37 to the desired position.

The projector housing 19 is further guided by an elongated retainer 95, FIGS. 12 and 13, which has an elongated slot 96 for receiving another flange 97 from the inner side of the side wall of the housing part 19*a*. Cement 98 holds the retainer 95 in place on the flange 97. A flange 99 extends from the retainer 95 in overlying relation to the teeth of the rack 18 and also over a flange 100 extending from the leg portion 17 on which the rack 18 is formed.

What is claimed as new is:

1. Apparatus for projecting an image from an image producing device comprising, in combination,
   (*a*) support means,
   (*b*) a projector housing on said support means and carrying a viewing screen,
   (*c*) a first mirror housing rotatably mounted on said projector housing and carrying mirror means for reflecting the image from said image producing device,
   (*d*) a second mirror housing rotatably mounted on said projector housing about the axis of rotation of said first mirror housing thereon and carrying mirror means for reflecting the image from the first mentioned mirror means onto said viewing screen, and
   (*e*) means operatively connected to said housings for conjointly rotating said mirror housings in opposite directions into said projector housing for storage and therefrom into operative relation for reflecting the image from said image producing device onto said viewing screen.

2. The invention, as set forth in claim 1, wherein
   (*a*) the housings are mounted for up and down movement on the support means to accommodate different elevations of the image producing device and
   (*b*) the rotation of the mirror housings is accomplished concurrently with the initial portion of the up movement and the final portion of the down movement of the housings.

3. Apparatus for projecting an image from an image producing device comprising, in combination,
   (*a*) support means,
   (*b*) a projector housing on said support means and carrying a viewing screen,
   (*c*) a first mirror housing rotatably mounted on said projecting housing and carrying mirror means for reflecting the image from said image producing device, (*d*) a second mirror housing rotatably mounted on said projector housing and carrying mirror means for reflecting the image from the first mentioned mirror means onto said viewing screen, (*e*) means mounting said projector housing for translatory movement carrying therewith said mirror housings to accommodate different elevations of said image producing device, (*f*) elevating means interacting between said support means and said projector housing for raising or lowering it, (*g*) means interacting between said support means and said first mirror housing causing it to move to operative position out of said projector housing during the initial raising movement thereof and to inoperative position into said projector housing during the final lowering movement thereof, and (*h*) means interacting between said support means and said second mirror housing causing it to move to operative position out of said projector housing during the initial raising movement thereof and to inoperative position into said projector housing during the final lowering movement thereof.

4. Apparatus for projecting an image from an image producing device comprising, in combination, (*a*) support means, (*b*) a projector housing on said support means and carrying a viewing screen, (*c*) a first mirror housing rotatably mounted on said projector housing and carrying a first mirror for reflecting the image from said image producing device, (*d*) a second mirror housing rotatably mounted on said projector housing and carrying second and third mirrors for reflecting the image from said first mirror in the order named onto said viewing screen, and (*e*) means operatively connected to said housings for rotating said mirror housings into said projector housing for storage and therefrom into operative relation for reflecting the image from said image producing device onto said viewing screen.

5. Apparatus for projecting an image from an image producing device comprising, in combination, (*a*) support means having upwardly extending rack means thereon, (*b*) a projector housing slidably mounted on said support means for up and down movement, (*c*) a viewing screen carried by said projector housing, (*d*) a shaft rotatably mounted on and movable up and down with said projector housing and carrying pinion means in engagement with said rack means, (*e*) means for rotating said shaft to raise or lower said projector housing, (*f*) a lower mirror housing rotatably mounted on said shaft and movable up or down therewith, (*g*) a lower mirror carried by said lower mirror housing for reflecting the image from said image producing device, (*h*) an upper mirror housing rotatably mounted on said shaft and movable up or down therewith, (*i*) an upper mirror carried by said upper mirror housing for reflecting the image from said lower mirror, (*j*) an intermediate mirror carried by said upper mirror housing for reflecting the image from said upper mirror onto said viewing screen, (*k*) means cooperating between said support means and said lower mirror housing for controlling movement thereof out of or into said projector housing on rotation of said shaft to raise or lower respectively said housings, and (*l*) means cooperating between said support means and said upper mirror housing for controlling movement thereof out of or into said projector housing on rotation of said shaft to raise or lower respectively said housings as aforesaid.

6. The invention, as set forth in claim 5, wherein the support means includes (*a*) a pair of upstanding rail members slidably mounting opposite vertical sides of the projector housing and guiding the same in its up and down movement, (*b*) laterally extending detent means on one of said rail members cooperates with flange means on the lower mirror housing for controlling its movement as aforesaid, and (*c*) laterally extending detent means on one of said rail members cooperates with flange means on the upper mirror housing for controlling its movement as aforesaid.

7. The invention, as set forth in claim 6, wherein the relationships between the detent means and the respective mirror housing are such as to effect the movements thereof out of the projector housing during the initial portion of its up movement and into the same during the final portion of its down movement.

8. The invention, as set forth in claim 6, wherein each of the housings comprises two complementary interfitting parts with the lower mirror housing parts having arms journaled on the shaft between inner and outer surfaces of the respective projector and upper mirror housing parts also journaled on said shaft.

9. The invention, as set forth in claim 8, wherein the complementary interfitting parts of the mirror housings are provided with facing mirror supports for mounting the respective mirrors thereon.

No references cited.